Oct. 28, 1969    E. B. BROWN    3,475,009
TRAFFIC BARRICADE
Filed Oct. 30, 1968
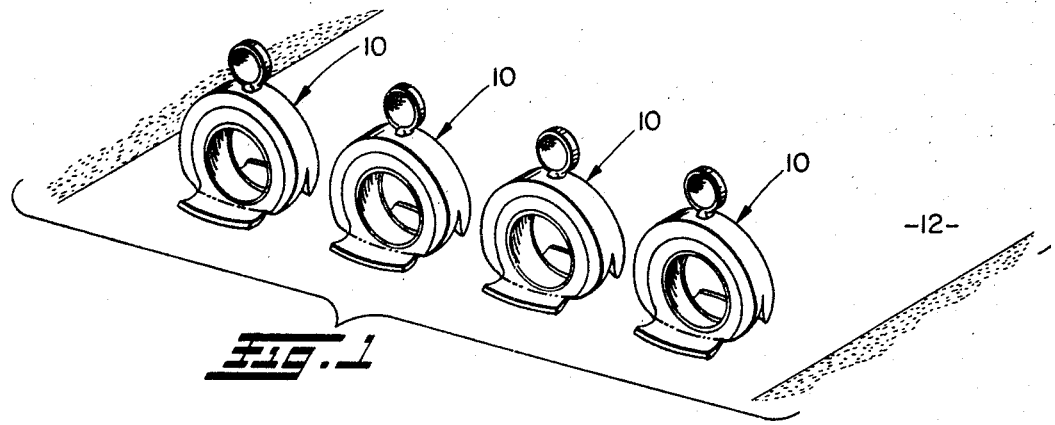
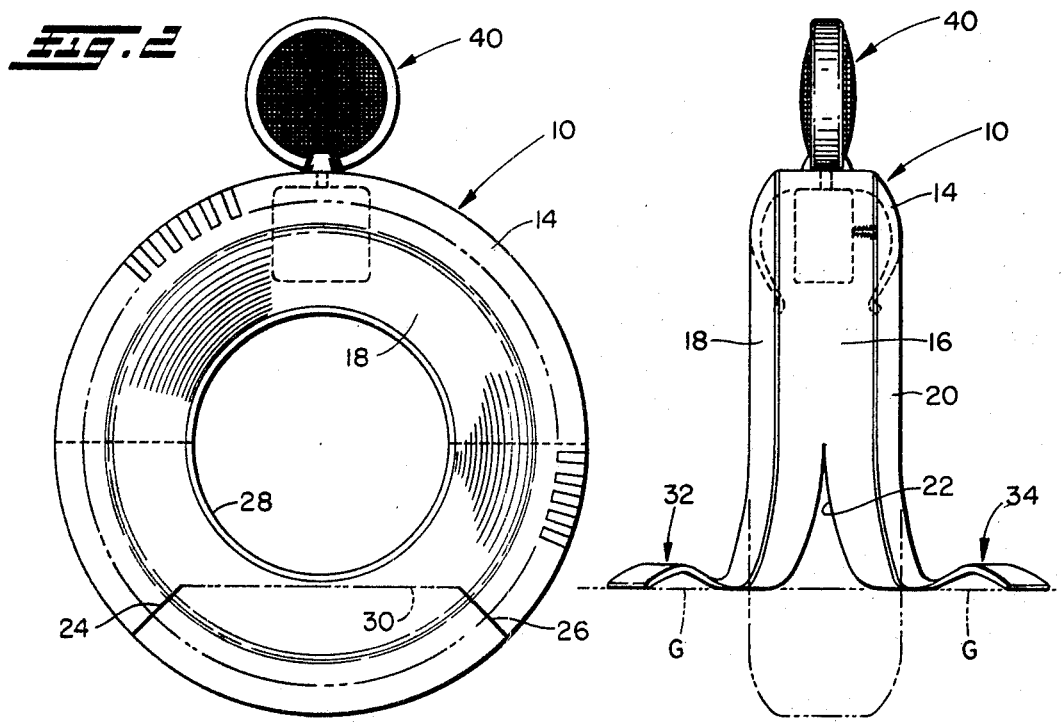
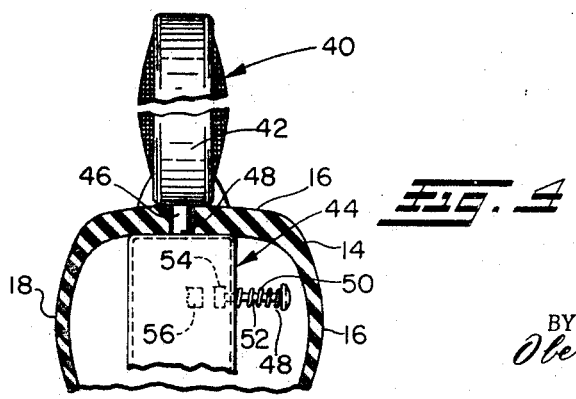
INVENTOR
ELVIS B. BROWN
BY Oberlin, Maky, Donnelly & Renner
ATTORNEYS

United States Patent Office

3,475,009
Patented Oct. 28, 1969

3,475,009
TRAFFIC BARRICADE
Elvis B. Brown, 33988 M St., Barstow, Calif. 92311
Filed Oct. 30, 1968, Ser. No. 771,891
Int. Cl. E04h 17/00
U.S. Cl. 256—64      7 Claims

ABSTRACT OF THE DISCLOSURE

A traffic barricade comprising individual barricades formed entirely from automobile tires of virtually any size and shape. The individual tires are uniquely modified so as to be entirely self-supporting on the road or like surface, with a plurality of such tires when disposed in alignment transversely of the road surface serving as a barricade to oncoming traffic. Individual flasher units are preferably mounted on each tire so as more effectively to warn the motorists of the approaching impasse.

BACKGROUND OF THE INVENTION

Traffic barricades of the type here concerned have long been used and comprise types too numerous to mention. A typical barricade frequently encountered in present day road construction environments is a sawhorse type unit carrying or having printed on the same suitable warning indicia to signify to the oncoming motorists the approaching impasse. Frequently, such units come equipped with flashers which serve to augment the warning function of the units and which permit use of the units for barricade purposes during periods of darkness.

While present barricade constructions of the type exemplified above have proved generally satisfactory, they have not entirely solved the problem. For example, the barricades which applicant is familiar with are items of manufacture whose cost is not insignificant. In addition, such barricades are commonly manufactured of materials such as wood or metal that require periodic maintenance if they are not to fall into a state of disrepair.

SUMMARY OF THE INVENTION

With the foregoing in mind, it is an object of the present invention to provide a traffic barricade composed of individual barricade units constructed normally of existing materials whose primary, intended original function has been fulfilled. In accordance with the present invention, each barricade unit comprises a discarded vehicle tire which usually can be obtained at little or no cost. Importantly, tires of relatively varying sizes can be employed in the arranging of a series of individual barricade units transversely of the road surface, as will be described.

A further object of the present invention is to provide a traffic barricade comprised of individual barricade units which are uniquely modified so as to be self-supporting on the road surface. Specifically, in accordance with the present invention, each tire is cut in a predetermined manner to form laterally extending supporting leg sections which extend laterally from the plane of the tire when vertically disposed and which serve as the sole suppotring means for the tire when positioned for use. The tire is cut to provide the noted laterially extended supporting leg sections, and to permit some degree of lateral expansion of the tire in the regions adjacent such leg sections thereby to stabilize the tire when vertically positioned for barricade use.

A still further object of the present invention is to provide a barricade unit in which a preferably battery operated flasher unit can be readily mounted therein, thereby increasing the warning effectiveness of the unit both in day and nighttime conditions.

A corollary object of the present invention is to provide a barricade unit which can be made simply and quickly and with much reduced unit cost, and which can be used for extended periods of time with little or no maintenance being required.

These and other objects of the invention will become apparent as the description proceeds in particular reference to the application drawings, in which:

BRIEF DESCRIPTION OF THE DRAWINGS

FIG. 1 is a perspective view of a traffic barricade composed of a plurality of individual barricade units disposed in transverse alignment across the road surface;

FIG. 2 is a front elevational view of a vehicle tire in which cuts have been made in the lower region thereof to form the supporting sections for the tire;

FIG. 3 is an end elevational view of a unit of FIG. 2 showing more clearly the manner in which the tire is cut and also showing the folding of the laterially extending supporting leg sections of the tire to a use position; and FIG. 4 is a fragmentary vertical sectional view through the radially upper region of the FIG. 2 unit, showing more clearly the manner in which the flasher unit is mounted on the periphery of the tire.

DETAILED DESCRIPTION OF THE INVENTION

Referring now in more detail to the drawings, wherein like parts are indicated by like reference numerals, and initially to FIG. 1, there is illustrated therein in perspective view a barricade assembly comprised of individual barricade units commonly and generally designated at 10. With the exception of somewhat varying size and shape, each individual unit is essentially the same as the other units, and the following description of one such unit will be understood to be applicable to the remaining units as well.

The units 10 in FIG. 1 are disposed in general transverse alignment across the road 12 thereby serving as a barricade to oncoming traffic. It will be apparent that, depending upon the size of each individual unit 10, more or less than the units shown in FIG. 1 can be provided to accomplish the intended barricade function.

Referring to FIGS. 2–4, each unit 10 comprises a tire casing 14 of a conventional vehicle tire. For purposes of economy, the casings normally employed in accordance with the present invention comprise worn-out or defective tires which would otherwise be discarded. The extent to which the tire is worn is of no consequence to the practice of the present invention, as long as sufficient wall and tread integrity remains to make the tire self-supporting when the tire has been physically modified as will be presently described to condition the same for use as a barricade unit.

The tire casing 14 comprises a continuous tread portion 16 and opposed side walls 18 and 20, of well known construction. To modify each tire for use as a barricade, the tread section 16 of the tire is slit as indicated at 22 longitudinally approximately one-half the circumference of the tread section 16, with the opposed ends of the slit 22 being generally in alignment with a horizontal plane through the axis of the tire. The slit 22 is transversely centered relative to width of the tread section so as to balance to the extent possible the opposed sides of the tire thereby stabilizing the same when the tire is disposed as part of a barricade assembly as shown in FIG. 1.

As best shown in FIG. 2, additional radially extending cuts illustrated at 24 and 26 are made in the side walls 18 and 20 of the casing, with each slit 24 and 26 extending radially inwardly approximately half the radial depth of the side wall and extending across the tread section 16 until intercepting the longitudinal slit 22. Each slit 24, 26 is preferably made by moving a suitable cutting tool radially inwardly in the desired area beginning at the tread section and terminating the cut at points approximately radially intermediate the tread section and the inner beads 28 of the casing 14. The plane connecting the radially inner ends of each cut 24 and 26 is preferably horizontal, referring to the FIG. 2 orientation of the casing, so as to provide the fold line 30 coincidental with such horizontal plane. Again, the provision of a generally horizontal fold line 30 serves to stabilize the casing when mounted in use thereby enhancing the self-supporting characteristics of the casing.

To briefly summarize the invention thus far described, the longitudinal slit 22 and radial slits 24 and 26 are formed in the casing 14 so as to provide in effect supporting leg sections generally indicated at 32 and 34. When each such section is folded laterally outwardly along the respective fold lines 30, the supporting sections act as stabilizers and firmly engage the ground surface, designated at G in FIG. 3. It will be noted that by virtue of the resiliency of the material forming the vehicle casing, each supporting section 32 and 34 will be inherently biased toward the main body of the casing whereby the sections 32 and 34 resiliently embrace the ground surface to further augment the stabilizing effect.

Although the radially extending slits 24 and 26 as shown in FIG. 2 are inclined approximately 45° to the horizontal, it will be understood that the inclination will to an important degree depend upon such factors as the width of the tread section 16, the diameter of the casing, the thickness of the wall and tread sections, etc., and is selected to provide the greatest degree of stability.

A flasher unit generally indicated at 40 is preferably associated with each barricade unit 10 so as to maximize the effective use of the unit during both day and nighttime conditions. As perhaps best seen in FIG. 4, each unit 40 comprises a housing 42 generally formed of glass or plastic and of conventional construction. The housing 42 has mounted therein a bulb (not shown) which is adapted to be energized by a battery unit generally indicated at 44 which is mounted interiorly of the vehicle casing 14. The unit 44 is operatively connected to the housing 42 through a tubular member 46 which extends through an opening 48 formed therefor in the tread section 16 of the casing. The entire unit can be suitably clamped or mounted to the tread section 16 in any suitable manner. The wiring electrically connecting the bulb disposed in the housing 42 with the batteries (not shown) disposed in the unit 44 extends through the tubular conduit 46.

An actuating rod 48 is mounted on the unit 44 and extends toward the inside surface of the side wall 16 of the casing. A coil spring 50 is operatively disposed around the shank 52 of the rod 48, with the outer end of the spring contacting the face of the enlarged head portion of the rod thereby biasing the same laterally toward the casing side wall.

The actuating rod 48 further includes a diametrically enlarged actuating end portion 54 which is adapted to engage a contact shown schematically at 56 mounted within the battery unit 44. It will thus be seen that when the actuating rod 48 is moved inwardly against the bias of spring 50, contact can be made between the members 54 and 56 thereby actuating the flasher unit. The switch is preferably of the common type wherein the circuit remains closed in response to actuation by the rod 48 until a subsequent manipulation by the rod to open the circuit. In this manner, the flasher can be energized at dusk, or sooner if circumstances warrant, and remain energized until the following morning. It will be understood that the circuit for the flasher unit also includes electrical means to provide the intermittent or flashing operation of the unit, which serves more effectively to warn the oncoming traffice of the barricade.

As above described, the outer end of the actuating rod 48 terminates relatively closely to the side wall 16 of the vehicle tire casing. This permits actuation of the rod, and thus the flasher unit, by simply engaging the side wall casing and pushing the same inwardly in the area of the actuating rod. This area can be identified on the exterior wall of the tire by suitable locating indicia. Alternatively, the flasher unit can be actuated by simply reaching up beneath the inner bead of the casing and directly engaging the end of the rod 48 for actuating the same.

It will thus be seen that in accordance with the present invention, a barricade unit can be provided which is highly economical and operationally effective. A series of discarded tires can be quickly adapted for barricade use by making a series of longitudinal and radial slits or cuts in the vehicle casing as above described, which slits permit the tire to be self-supporting and provide the desired stability of the unit when so mounted. A flasher unit is preferably operatively mounted with each individual barricade unit, with a series of units when transversely aligned on the road surface providing a very effective barricade system.

It will be apparent that obvious variations can be made from the above description without, however, departing from the scope of the invention.

I claim:

1. A road barricade unit comprising a vehicle tire casing having opposed side wall sections and an intermediate tread section extending circumferentially of the tire, said tread section being cut longitudinally a substantial distance circumferentially of the tire on a line generally midway transversely of said tread section, each of said side wall sections being cut radially on circumferentially spaced lines which are at a predetermined angularity with respect to a horizontal plane through the axis of said tire when said tire is vertically disposed, the radially outer end of each of said radial cuts intersecting said longitudinal cut and the radially inner end of each of said cuts terminating generally radially midway between the outer surface of said tread section and the radially inner edge of said side wall section, said longitudinal and radial cuts defining a pair of tire supporting sections adapted to be moved laterally outwardly beyond said side wall sections into a ground-engaging position thereby to support said tire casing without additional supporting means.

2. The barricade unit of claim 1 wherein the radially inner ends of each pair of radial cuts are disposed in a generally horizontal plane when said casing is vertically disposed for use, said horizontal plane comprising the hinge axis for the associated tire supporting section thereby stabilizing the unit when mounted.

3. The unit of claim 2 wherein said last mentioned horizontal plane is contained entirely within the respective side wall sections of the casing.

4. The barricade unit of claim 1 further including a flasher unit mounted on said barricade unit adjacent the top thereof, and means for selectively activating said flasher unit for illuminating the same.

5. The barricade unit of claim 4 wherein said flasher unit comprises a lamp housing extending outwardly from said tread section, and an interconnected battery housing disposed entirely with said casing.

6. The barricade unit of claim 5 wherein said battery housing includes an actuating rod extending laterally from the side thereof and terminating relatively adjacent one of said side wall sections thereby to permit actuation of said rod, and thus said flasher unit, from the exterior of said barricade unit by engaging and pressing the adjacent area of the associated side wall section.

7. The barricade unit of claim 6 wherein the radially inner ends of each pair of radial cuts are disposed in a generally horizontal plane when said casing is vertically disposed for use, said horizontal plane comprising the hinge axis for the associated tire supporting section thereby stabilizing the unit when mounted.

References Cited
UNITED STATES PATENTS

| | | |
|---|---|---|
| 1,776,253 | 9/1930 | Farrow. |
| 1,777,719 | 10/1930 | Duffus. |
| 2,177,467 | 10/1939 | Sunderhauf. |
| 2,235,283 | 3/1941 | Carver _____ 248—176 X |
| 2,610,502 | 9/1952 | Carlson _____ 94—1.5 X |
| 2,654,168 | 10/1953 | Heal. |
| 3,298,121 | 1/1967 | Wathen. |

DENNIS L. TAYLOR, Primary Examiner

U.S. Cl. X.R.

40—125; 116—63; 240—2; 248—176; 340—331